United States Patent [19]

Ellis et al.

[11] Patent Number: 4,867,204
[45] Date of Patent: Sep. 19, 1989

[54] MOISTURIZED TUBULAR CELLULOSIC FOOD CASING AND PROCESS FOR PREPARING

[75] Inventors: David E. Ellis, Frankfort; Herman S. Chiu, Chicago, both of Ill.

[73] Assignee: Viskase Corporation, Chicago, Ill.

[21] Appl. No.: 298,277

[22] Filed: Jan. 13, 1989

Related U.S. Application Data

[63] Continuation of Ser. No. 143,306, Jan. 11, 1988, abandoned, which is a continuation of Ser. No. 849,341, Apr. 7, 1986, abandoned, which is a continuation of Ser. No. 498,709, May 27, 1983, abandoned, which is a continuation of Ser. No. 157,008, Jun. 6, 1980, abandoned, which is a continuation of Ser. No. 14,644, Feb. 23, 1979, abandoned, which is a continuation of Ser. No. 874,293, Feb. 1, 1978, abandoned, which is a continuation-in-part of Ser. No. 844,987, Oct. 25, 1977, abandoned, which is a continuation of Ser. No. 686,248, May 13, 1976, abandoned.

[51] Int. Cl.$^4$ ............................................. A22C 13/00
[52] U.S. Cl. ................................ 138/118.1; 426/135; 428/34.8
[58] Field of Search ............... 426/105, 133, 135, 140, 426/278, 282, 284, 310, 323, 326, 332, 335, 410, 413, 415, 420, 532, 506, 512, 513, 805; 138/118.1, 177; 17/42, 49; 206/802; 428/34.8

[56] References Cited

U.S. PATENT DOCUMENTS

| | | |
|---|---|---|
| 1,868,203 | 7/1932 | Henderson et al. |
| 2,379,294 | 6/1945 | Gooding . |
| 2,532,489 | 12/1950 | Ferguson . |
| 2,802,744 | 8/1957 | Weingand . |
| 2,906,646 | 9/1959 | Smith et al. |
| 2,979,410 | 4/1961 | Parlour |
| 3,202,514 | 8/1965 | Burgess et al. |
| 3,222,192 | 12/1965 | Arnold et al. |
| 3,427,169 | 2/1969 | Rose et al. |
| 3,594,856 | 7/1971 | Michl . |
| 3,617,312 | 11/1971 | Rose . |
| 3,764,351 | 10/1973 | Whittington et al. .......... 206/802 X |
| 3,805,330 | 4/1974 | Martinek . |
| 3,864,499 | 2/1975 | Turbak ................. 426/138 |
| 3,884,270 | 5/1975 | Rasmussen et al. |
| 3,886,979 | 6/1975 | Rasmussen .......... 138/118.1 |
| 3,898,348 | 8/1975 | Chiu et al. ............ 426/413 |
| 3,945,404 | 3/1976 | Yamamatsu et al. ......... 138/118.1 |
| 3,962,462 | 6/1976 | Burkwall, Jr. et al. ............... 426/1 |
| 3,971,187 | 7/1976 | McNeill et al. ............ 206/802 X |
| 3,981,046 | 9/1976 | Chiu ................... 17/49 |
| 4,006,756 | 2/1977 | Gerigk et al. ............ 138/118.1 |
| 4,026,985 | 5/1977 | Rasmussen .......... 264/129 |
| 4,033,382 | 7/1977 | Eichin .................. 206/802 X |

FOREIGN PATENT DOCUMENTS

| | | |
|---|---|---|
| 902421 | 6/1972 | Canada . |
| 499894 | 6/1930 | Fed. Rep. of Germany . |
| 566121 | 12/1932 | Fed. Rep. of Germany . |
| 920903 | 3/1963 | United Kingdom . |

OTHER PUBLICATIONS

"The Effect of Propylene Glycol (1,2 Propanedial) on Bacteria", Arch. Hyg. Bakteriol, 147 (1963), pp. 189–200.

"A Study of the Inhibitory Concentrations of Glycerin–Sorbitol and Propylene Glycol–Sorbitol Combinations on the Growth of Microorganisms", J. Am. Phar. Assoc., vol. XLVI, No. 4 (1956), pp. 217–218.

"Sterilization Disinfection Konserverung Chemotherapic", by Wallhauser and Schmidt (Stuttgart 1067), p. 155.

"CRC Handbook of Food Additives" (2d ed., 1972), pp. 129–137.

Furia; Handbook of Food Additives; 1968; The Chemical Rubber Co., 18901 Cranwood Parkway, Cleveland, Ohio, p. 158.

Haas et al; Microbial Stability of Intermediate Moisture Food Product Development, Apr. 1975, p. 86.

Article; The Viscora-Flash, Mar. 1972, p. 7.

Primary Examiner—Arthur L. Corbin
Attorney, Agent, or Firm—Roger Aceto

[57] ABSTRACT

A method of manufacturing a large size tubular cellulosic food casing suitable for being stuffed with a foodstuff without requiring an additional moisturizing step prior to stuffing, comprising the steps of providing a large size tubular cellulosic food casing including a plasticizer substantially uniformly incorporated therein; adjusting the moisture content of the casing to impart to the casing sufficient extensibility and flexibility for the casing to be stuffed without the addition of further moisture prior to the stuffing of said casing, and treating the casing with an antimycotic agent to incorporate a sufficient amount of the antimycotic agent in the casing to render the casing resistant to growth of molds, fungi, and microorganisms prior to the stuffing of the casing with the foodstuff.

15 Claims, No Drawings

MOISTURIZED TUBULAR CELLULOSIC FOOD CASING AND PROCESS FOR PREPARING

This application is a continuation of Ser. No. 07/143,306 abandoned which is a continuation of Ser. No. 06/849,341, 04/07/86 abandoned which is a continuation of Ser. No. 06/498,709, 05/27/83 abandoned which is a continuation of Ser. No. 06/157,008, 06/06/80 abandoned which is a continuation of Ser. No. 06/014,644, 02/23/79 abandoned which is a continuation of Ser. No. 05/874,293, 02/01/78 abandoned which is a continuation-in-part of Ser. No. 05/844,987, 10/25/77 abandoned which is a continuation of Ser. No. 05/686,248, 05/13/76 abandoned.

This invention relates to improved food casings and more particularly to large tubular cellulosic food casings, particularly fibrous food casings.

Food casings are used throughout the world in the processing of a great variety of meat and other food products, such as sausages of various types, cheese rolls, turkey rolls, and the like. Casings that are most generally used are artificial tubular food casings prepared from regenerated cellulose and other cellulosic materials, that may be of several different types and sizes to accommodate the different categories of food product to be prepared. Tubular food casings are provided in supported or unsupported form with the supported casings, which are commonly referred to as "fibrous casings", being prepared with a fibrous support web embedded in the wall thereof.

A common feature of many processed food products, and particularly meat products, is that the mixture of ingredients of which the food product is made up, commonly called an "emulsion", is stuffed into a casing under pressure, and processing of the food product is carried out while encased in the casing. The food product may also be stored and shipped while encased in the casing, though in many instances, and particularly in the case of small sausage products such as frankfurters, the casing is removed from the food product after the processing procedures are completed.

One category of tubular food casings is commonly referred to as "small food casings", which designation generally refers to those casings employed in the preparation of small size sausage products such as frankfurters. As the name suggests, this type of food casing is small in stuffed diameter, generally having a diameter within the range of from about 15 mm to about 40 mm, and is most usually supplied as thin-walled tubes of very great length. For convenience in handling, these casings, which may be 20 to 50 meters in length or even longer, are shirred and compressed to produce what is commonly referred to as "shirred casing sticks" of from about 20 cm to about 60 cm in length. Shirring machines and the products thereof are shown in U.S. Pat. Nos. 2,983,949 and 2,984,574 among others.

In the preparation and use of artificial food casings, particularly small size casings formed of regenerated cellulose, the moisture content of the casings is of extreme importance. When small size cellulosic casings are first formed, it is generally necessary that they be dried to a relatively low water content, usually in the range of about 8% to 12% by weight, to enable shirring operations to be carried out without damage to the casings. To permit ready deshirring of the compressed, shirred small size cellulosic casing and prevent tearing and breaking of the casing during stuffing operations, shirred casings having an average moisture content of between about 14% to 20% by weight are required. This relatively narrow range of moisture content is important because excessive breakage of the casing during stuffing has been found to occur at lower moisture contents, and greater moisture content results in excessive plasticity of the casing material and overstuffing.

Generally, the instant invention is directed to food casings which require a relatively large moisture content which can generally exceed about 20%. Such food casings are characterized by a relatively thicker wall thickness than small food casings and therefore, require the higher moisture contents in order to provide extensibility to the casings to permit stuffing operations without undesirable levels of internal pressure. Casings of the invention generally include the class of casings identified as "large size food casings."

"Large size food casings" is a common designation for casings that are used in the preparation of generally larger food products, such as salami and bologna sausages, meat loaves, cooked and smoked ham butts and the like, and that are produced in sizes ranging in stuffed diameter from about 50 mm to about 150 mm or even larger. In general, such casings have a wall thickness about three times greater than "small size casings," and are provided with a fibrous web reinforcement embedded in the wall, though they may be prepared without such supporting medium. In most cases, large size tubular casings are supplied to the food processor in flattened condition, cut to predetermined lengths of from about 2 feet (0.6 m) to about 7 feet (2.2 m), but improvements in shirring and packaging techniques and increased use of automatic stuffing equipment is increasing the demand for supplying large size fibrous and unsupported casings in the form of shirred sticks containing up to about 100 feet (30 m) and even more of casing.

A number of patents have issued in recent years dealing with the problem of the moisture content of shirred small size tubular food casings, and suggesting various method for obtaining the desired moisture level and maintaining it during storage and shipping. For example, in U.S. Pat. Nos. 2,181,329 to Hewitt, 3,250,629 to Turbak, and 3,471,305 to Marback, packaging means are disclosed that will enable a plurality of shirred casing sticks of small size tubular casing to be humidified while packaged; and in U.S. Pat. Nos. 3,222,192 to Arnold, 3,616,489 to Voo et al., 3,657,769 to Martinek, 3,809,576 to Marback et al. and 3,981,046 to Chui various means are disclosed for moisturizing generally small size tubular food casings before or during the shirring operation.

Conventionally, large size casings, which are generally supplied in short lengths of flattened tubing and are quite stiff in the dry state, are normally softened for stuffing operations by soaking in water, preferably for about an hour, to raise the moisture content to about 60%. Therefore, the need to supply such casings with a predetermined moisture content has not been found to be necessary, and controlled moisturization by the casing manufacturer has not been warranted. However, the wider use of automatic stuffing equipment for products employing large size tubular food casings, and the increased demand for supplying such casings in shirred form as compared to short, flattened lengths, has emphasized the problems of moisturizing such casings by soaking. Moreover, the need for greater control of all aspects of the manufacture and use of large size food casings has been increasing. For example, the uniformity of dimensions of stuffed food casings and food products processed therein has become an increasingly important commercial requirement, and casing moisture content has been found to be a factor in control of uniformity, as well as in meeting the continuing need to readily and economically stuff the casings without damage or breakage thereof.

Providing shirred casing sticks of small size casings, having uniformly distributed throughout the length therefore the relatively narrow range of moisture content that is required for stuffing operations, has been more economically accomplished by the food casing manufacturer during the manufacture or packaging of the casings, and it is becoming increasingly evident that similar advantages could be realized if means were developed for the casing manufacturer to supply large size casings, both in flattened and shirred forms, that could be readily employed in casing stuffing operations, particularly mechanical stuffing operations, without the need for undue manual handling by the food processor.

Although it has not been found necessary in the past to maintain the moisture content of large size food casings within a relatively narrow range, somewhat higher levels of moisture content are required to afford the desired flexibility of such casings as compared to that required for "small size casings," and the greater amounts of water and increased weight of the casings substantially increases the cost of packaging and shipping. In addition, one of the problems which may be encountered during the handling and processing of such high moisture containing cellulosic food casings involves the growth of molds, fungi, or other microorganisms, since high moisture is one of the necessary factors for inducing such growth on cellulosic casings. It is known, for example, that cellulosic food casings have a critical moisture content above which the growth of molds or fungi during periods of storage is greatly enhanced. Keeping the moisture content of cellulosic casings below a predetermined level, generally below about 20% by weight of moisture based on the total weight of the casing, is an effective measure that may be taken to control the development of such growth. However, in cases where proper control of moisture content cannot be used to inhibit such growth, it is necessary to provide other means to inhibit the growth of molds or fungi.

Consequently, large size tubular cellulosic food casings, and particularly tubular fibrous casings, that may be readily stuffed without damage or breakage, must be provided with moisture contents that afford adequate flexibility and also with suitable means for inhibiting the growth of molds or other microorganisms during periods of shipping and extended storage.

The problem of mold growth in food products due to the presence of nutrients that promote the growth of microorganisms and cause food spoilage has been the basis of a number of studies over the years. As a result of these studies, various treatments have been evaluated and recommended, including combinations of sugars and polyhydric alcohols, as inhibitors for preventing the growth of microorganisms that are commonly recognized as being responsible for food spoilage. However, the antimycotic treatment of cellulose food casings has presented problems due to the processing techniques employed in the preparation and stuffing of the casing. Some suggestions for overcoming such problems and achieving antimycotic treatment of casings used for sausage products, such as dry sausages, have been the subject of several recently issued patents. For example, in U.S. Pat. No. 3,617,312 to Rose, an antimycotic agent is applied to cellulose casings as a component of a curable, water-insoluble coating, and in U.S. Pat. No. 3,935,320 to Chiu et al., cured, water-insoluble cationic thermosetting resin coatings applied to the surfaces of casings reduce deterioration wrought by enzymatic action.

The additional processing steps required for antimycotic treatment of casing with curable coating compositions adds to the costs and complexity of the casing manufacturing process, and the need still exists for the development of "large size" casings that are suitable for stuffing without further soaking by the food processor, particularly when such casings can be prepared by methods that do not substantially increase the complexity and costs of manufacturing and storage.

In accordance with the present invention, there is provided a method of manufacturing a large size tubular cellulosic food casing suitable for being stuffed with a foodstuff without requiring an additional moisturizing step prior to stuffing, comprising the steps of providing a large size tubular cellulosic food casing including a plasticizer substantially uniformly incorporated therein, adjusting the moisture content of the casing to impart to the casing sufficient extensibility and flexibility for the casing to be stuffed without the addition of further moisture prior to the stuffing of the casing, and treating the casing with an antimycotic agent to incorporate a sufficient amount of the antimycotic agent in the casing to render the casing resistant to growth of molds, fungi, and microorganisms prior to the stuffing with the foodstuff.

Preferably, the antimycotic agent comprises propylene glycol in the amount of at least about 10% by weight of the liquid components in the casing for a moisture content of at least about 17.5 by weight. The propylene glycol can be present in greater amounts such as at least about 20% by weight of the liquid components in the casing.

Generally, it has been discovered that a large size tubular cellulosic food casing, including fibrous casing, having sufficient moisture for the casing to be stuffed with a foodstuff, can be stored for extended periods of time and then stuffed without an additional moisturizing step prior to the stuffing and no growth of molds, fungi, or other microorganism occurs in the casing during the period of time prior to the stuffing of the casing. This is a surprising and advantageous result because it permits the elimination of a moisturizing step just prior to the stuffing and thereby improves substantially the operations associated with stuffing as well as providing economy.

The present invention also relates to a process for preparing an encased food product which comprises providing a large size cellulosic food casing; adjusting the moisture content of said casing to impart to the casing sufficient extensibility and flexibility to be stuffed with a foodstuff without the addition of further moisture; incorporating into the casing an antimycotic agent in an amount sufficient to render the casing, prior to stuffing, resistant to growth of molds, fungi and microorganisms; and without adding moisture, stuffing the casing with the foodstuff to form the encased food product.

Preferably, the food casing is treated with an amount of an aqueous propylene glycol solution of a concentration that will concurrently provide both the predetermined moisture content for the casing and the desired amount of propylene glycol.

Reference to the terms "moisture content," "propylene glycol content," "glycerine content," "polyol content," as used throughout this specification and in the appended claims with respect to the cellulosic casings of the invention, unless otherwise specified, are intended to refer to, and should be understood as referring to:

"moisture or water content"

the weight % of water or moisture in the casing based on the total weight of all the ingredients in the casing.

"propylene glycol content," "glycerine content," "polyol content"

the weight of polyol in the casing divided by dry weight of cellulose plus surface coating, if any, in the casing, expressed as the weight percent (%).

Further, reference to the term "weight of liquid components in the casing" should be understood as referring to the weight of the liquid ingredients in such casings including water, polyols, and/or other soluble antimycotic agents, but excluding mineral oil and other non-miscible lubricants.

As used herein, the term "foodstuff" is intended to include food emulsions and food in chunk form and the like for use in stuffing a food casing.

Large size tubular cellulosic food casings that are suitable for use in the casings of the present invention may be prepared by any one of the methods well known in the art. The tubular casings are generally flexible, seamless tubing formed of regenerated cellulose, cellulose ethers and the like, and can be prepared by known processes, such as the cuprammonium process, the deactylation of cellulose acetate, the denitration of cellulose nitrate, and preferably the viscose process. Tubular casings reinforced with fibers such as, for example, rice paper and the like, hemp, rayon, flax, sisal, nylon, polyethylene terephthalate and the like, are most advantageously employed in application requiring large diameter tubular food casings. Tubular fibrous casings can be made by methods and apparatus described, for example, in U.S. Pat. Nos. 2,015,273; 2,144,899; 2,910,380; 3,135,613; and 3,433,633.

As is well known in the art, tubular cellulosic casings prepared by any one of the well known methods are generally treated with glycerine, as a humectant and softening or plasticizing agent, to provide resistance to drying or cracking of the casing during storage prior to stuffing. The glycerine treatment is usually carried out by passing the casing while still in the gel state through an aqueous glycerine solution, after which the plasticized casing is dried to a predetermined moisture content prior to further processing or winding up on reels for storage. Generally, large size tubular casings will contain about 25% to 40% glycerine and have a moisture content of about 5% to 10% prior to being moisturized.

Generally, large size cellulosic food casings of this invention suitable for being stuffed with a foodstuff have a moisture content of at least about 17.5%, although a moisture content as low as about 13% may be acceptable for certain operations. Manufacturing standards require that casings be produced within a predetermined range of moisture contents and this range is generally from about 17.5% to about 27%. In actual practice, the higher level of moisture content is used as the target value in order to allow for expected loss of moisture during the handling and storage of the casings. Although the lower limit of casing moisture content is important, there is no critical upper limit and moisture content in excess of that actually required is determined generally by economic considerations. However, casing moisture content greater than about 35% may adversely affect desirable characteristics of the casings for certain applications and should be avoided.

In view of the high moisture content necessary to impart desired extensibility and other stuffing characteristics, antimycotic treatment of the casings is essential to prevent growth of molds, fungi, or other micoorganisms during storage and shipping. Suitable antimycotic agents that have been found to afford at least some degree of protection are polyhydric alcohols that are normally liquid at ambient temperatures, and solutions of normally solid polyols. Exemplary agents are glycerine, triethylene glycol, low molecular weight polyethylene glycols, and sorbitol solutions. Most suitable and especially preferred are propylene glycol and mixtures of propylene glycol with glycerine.

Also suitable are chemical antimycotic agents such as, for example, potassium, sodium, and calcium propionate or sorbate, sorbic acid, propionic acid, and the lower alkyl esters of parahydroxybenzoic acid such as methyl, ethyl, or propyl-parahydroxy-benzoate.

The quantity of antimycotic agent applied to the casing is important, and generally depends on the moisture content of the casing. Propylene glycol, which is especially preferred for use as an antimycotic agent, should be employed in an amount of at least about 5% by weight and preferably about 10% by weight of the liquid components in the casing, while the upper limit of the amount of the propylene glycol is not critical and is determined primarily by economic considerations. It has been found, however, that it is necessary to use substantially greater amounts of other polyol antimycotic agents for the particular levels of casing moisture content that impart the required extensibility and stuffing characteristics to casings of the present invention. The amount of such other polyol antimycotic agents required may be readily determined in accordance with the teaching of the present invention.

Preventing the growth of molds and fungi on cellulose casing will also provide control over the growth of bacteria and yeasts, since it is known that, in general, molds require less moisture for growth than yeasts and bacteria.

Tubular cellulosic food casings of the present invention may be prepared by applying the essential amounts of water and antimycotic agent to suitable "dried" tubular food casings using any one of a number of methods well known in the art. In general, casings may be treated by spraying, brushing, dipping, slugging, etc. Preferably, the casing should be treated with the desired amounts of moisture and antimycotic agent as flattened casing on storage reels is being made ready for packaging in short, flat lengths thereof, or is being rewound on a reel for advancing through a shirring machine. By proportioning the amounts of water and antimycotic agent, either individually or in combination, to the size of casings to be treated, relatively precise control of the moisture content and antimycotic agent content of the casings of the invention may be attained.

In preparing the tubular cellulosic food casings of the present invention, various other materials or treatments well known in the art can be utilized to impart particular characteristics or properties to the casing provided, of course, that such material or treatment is compatible with and has no adverse effect on the food casings or the use thereof. Among further treatments that may be employed are, by way of illustration, coatings applied to improve peelability of the casings from encased food products such as disclosed in U.S. Pat. No. 2,901,358 to Underwood; coatings applied for improving adhesion to dry sausage products such as disclosed in U.S. Pat. No. 3,378,379 to Shiner et al.; coatings applied to afford vapor barrier properties such as disclosed in U.S. Pat. No. 3,886,979 to Rasmussen, and the like. Moreover, tubular casings of the present invention may be shirred and compressed employing conventional shirring machines and methods as disclosed, for example, in U.S. Pat. Nos. 2,984,574 to Matecki, 3,110,058 to Marbach, and 3,397,069 to Urbutis et al.

This invention will become more clear when considered together with the following examples which are set forth as being merely illustrative of the invention and which are not intended, in any manner, to be limitative thereof.

EXAMPLE 1

A substantial quantity of tubular fibrous casing having a moisture barrier coating of polyvinylidene chloride copolymer applied to the outside surface thereof was prepared as disclosed in U.S. Pat. No. 3,886,979 to Rasmussen. The casing had an average dry flat width of about 3.8 inches (about 97 mm) and a recommended stuffed diameter of about 2.87 inches (73 mm).

100 foot lengths of the casing were internally treated with varying amounts of aqueous propylene glycol solutions by the well known "slugging" technique and the treated lengths of casing were then shirred and compressed on a standard shirring machine and retained in an elastic sheathing material. Each of the samples of treated and shirred casings of this Example were mounted without soaking on a stuffing apparatus such as disclosed in the U.S. Pat. No. 4,017,941, and stuffed with a liver sausage emulsion to make 25 inch long sausage logs that were then water cooked. For comparison purposes, a shirred length of barrier coated fibrous casing that was not treated with propylene glycol was soaked in water for about an hour and then stuffed with liver sausage emulsion and water cooked.

Summarized in Table 1 below are the moisture and propylene glycol contents of the various casing samples of this Example and several of the measurements made on the stuffed casings. Casing Samples A, B, and C were stuffed using the apparatus of the U.S. Pat. No. 4,017,941, wherein the control mechanism of such apparatus was operated to vary the location of the casing sizing means and thereby provide diameter control of the size of a stuffed casing. Sample Casings D, E, and F were stuffed with the same stuffing apparatus with a fixed location of the casing sizing means.

Casing Samples A, B, D, and F were all found to stuff satisfactorily and produce substantially uniformly sized sausage products. Casing Sample C produced sausage products with "ballooned" ends and Casing Example E exhibited an unacceptably large breakage rate during stuffing.

TABLE 1

| Casing Sample | Moisture Content | | Propylene Glycol | | Green Stuffed Diameter, Inches (Average) | | |
|---|---|---|---|---|---|---|---|
| | Weight % of Total Casing | Weight % of Bone Dry Cellulose | Wt. % on Bone Dry Cellulose | Wt. % of Liquid Components | First | Middle | Second |
| A | 13.3 | 28.1 | 22.9 | 25.7 | 2.88 | 2.88 | 2.875 |
| B | 14.0 | 29.1 | 27.7 | 37.0 | 2.87 | 2.86 | 2.87 |
| C | 10.7 | 22.0 | 31.3 | 34.2 | 2.88 | 2.87 | 2.87 |
| D | 13.5 | 28.3 | 22.9 | 25.7 | — | 2.84 | — |
| E | 10.7 | 22.0 | 31.3 | 34.2 | — | 2.90 | — |
| F | Soaked | Soaked | None | None | — | 2.89 | — |

EXAMPLE 2

A quantity of tubular fibrous cellulosic casing prepared using conventional methods and coated internally with an easy peel coating as disclosed in U.S. Pat. No. 2,901,358 to Underwood was used in preparing the casing samples of this Example. The casing had an average dry flat width of about 6.1 inches (155 mm) and a recommended stuffing diameter of 4.59 inches (177 mm).

The casing was treated with an aqueous propylene glycol solution by brushing the solution on the outside surface of flattened casing that was then fed to a standard shirring machine. Three lengths of shirred casing, each containing about 200 feet of casing, were prepared. Each shirred length of casing was retained in an elastic sheathing material and then packaged in a polyethylene lined carton. The casing samples were determined to have a moisture content of 21.8% based on the weight of casing and 40.9% based on the weight of dry cellulose, and to have a propylene glycol content of 18.8% based on the weight of dry cellulose and 20.7% based on the weight of liquid components.

Each of the lengths of shirred casing was stuffed without soaking on stuffing apparatus such as disclosed in the U.S. Pat. No. 4,017,941. A bologna type meat emulsion was used to make 60-inch sausage logs that were processed using conventional methods. The bologna sausages produced had substantially uniform stuffed diameters and no casing damage or breakage occurred during the stuffing of any of the casing sample.

EXAMPLE 3

In this Example storage tests illustrate the effectiveness of various proportions of mold growth inhibitory agents used to treat large size tubular cellulosic casings having various levels of moisture content.

A group of tubular casing samples were prepared with the following proportion of ingredients.

| | |
|---|---|
| Regnerated cellulose | 72.5 parts by weight |
| Glycerine | 22 parts by weight |
| Moisture | variable |

| -continued |  |
|---|---|
| Mold growth inhibitors | variable |

8 size fibrous casings, which have a recommended stuffed diameter of about 4.79 inches, were used in the storage tests of this Example.

Casing samples were prepared by adding various amounts of water and mold growth inhibitors by brushing aqueous solutions thereof over the surface of the casing in the following proportions:

A first set of casing samples contained moisture levels of about 20%, 25%, 35% and 45% by weight of casing with varying propylene glycol levels. Samples at each moisture level contained propylene glycol in amounts of about 10%, 15%, 20%, 30%, and 40% by weight of liquid components in the casing.

A second set of casing samples contained casing moisture levels of about 25%, 30%, and 37.5% by weight of casing with varying potassium sorbate levels. Samples at each moisture level contained 0.5%, 1.25%, and 2.5% by weight of potassium sorbate based on the weight of liquid components.

A third set of casing samples contained casing moisture levels of 25%, 30%, and 27.5% by weight of casing with varying sodium benzoate levels. Samples at each moisture level contained 0.05% and 0.1% by weight of sodium benzoate based on the weight of liquid components.

Also prepared, for control purposes, were casing samples having moisture content levels of 21.0% 26.2%, 37.2%, and 59.2%, to which no mold growth inhibitors were added.

Where possible, 50 foot lengths of the moisturized and mold inhibitor treated casings were shirred and compressed to about 1 foot in length, and thus retained in an elastic sheathing material. In those instances where greater amounts of moisture and mold growth inhibitors were used, flattened casing samples 5 feet in flattened length, were prepared.

A mixture containing thirty-one different mold spores in a 1% sodium citrate solution was prepared using conventional aseptic procedures with a concentration of about 1 to 5 million mold spores per milliliter of solution. Among the mold cultures included in the mixture was *Aspergillus niger* (ATCC #1004), *Chaetonium globosum* (ATCC 116021), *Memnoniella echinata* (ATCC #11973), *Myrothecium verrucaria* (ATCC #9095), *Trichoderma viride* (ATCC #26921), and *Whetzelinia sclerotiorum* (ATCC #18657), all of which were purchased from American Type Culture spores of nine unknown cultures that were isolated from mold contamination found on various cellulosic food casings, and mold spores of sixteen unknown cultures that were isolated as naturally occurring air borne contaminants obtained from within casing manufacturing sites.

The solution was employed as an inoculant in evaluating the mold growth resistance of the various casing samples of this Example.

All inoculations of casing samples were done by brushing several milliliters of the mold spore containing solution over a 3 inch by 6 inch area of exposed casing surface. The inoculated casing samples were then packaged in sealed polyethylene bags and stored at room temperature for extended periods of time.

After 10 weeks of aging, mold growth was visually observed on the control samples without mold growth inhibitor having moisture contents of 26.2% (55% by weight based on dry cellulose) and more. The growth of mold was also observed on casing samples with moisture contents of about 35% and 45% having propylene glycol contents of 10% and 15% based on liquid components (8.2% and 13% respectively based on the dry cellulose); on casing samples with 25% and more moisture content containing 0.5% and 1.25% potassium sorbate; and on casing samples with 30% and more moisture content containing 0.056% and 0.1% sodium benzoate. After more than 30 weeks of storage, casing samples containing at least 20% propylene glycol based on the liquid content of the casing and at least 18% based on the dry cellulose exhibited no mold growth, regardless of the casing moisture content. Casing samples containing 2.5% of potassium sorbate were similarly free from mold growth at all moisture content levels.

EXAMPLE 4

A culture dish mold growth test was used to illustrate mold growth inhibition by various polyhydric alcohols (polyols).

A conventional potato-dextrose agar solution was used as the base media into which was incorporated various proportions of polyols. The agar and polyol component solutions were sterilized using well known procedures and tartaric acid was added to combined solutions to obtain a pH of about 3.5 in the final agar media. The mold culture of Example 3 was used as the inoculant in this Example.

Test solutions were prepared with glycerine, propylene glycol, d-Sorbitol, triethylene glycol, Carbowax 300 (low molecular weight polyethylene glycol), and 25%/75%, 35%/65%, 45%/55% mixtures of propylene glycol/glycerine. The test solutions were prepared in polyol concentrations of 5%, 7.5%, 10%, 1.25%, 15%, 17.5%, 20%, 22.5%, 25%, 30%, 40% 50%, and 60% by weight.

The inoculated test solutions were stored in covered dishes for sever days at ambient temperature and were then visually observed for any growth of mold. Propylene glycol was found to inhibit mold growth in concentrations of 15% or greater, whereas none of the other polyol materials exhibited mold growth inhibition at less than 30% concentration. The mixtures of propylene glycol and glycerine were also substantially better mold growth inhibitors than the other polyols tested, including glycerine by itself. The 25%/75% mixture of propylene glycol and glycerine inhibited the growth of mold in test solution concentrations of 25% and greater, and the 35%/65% and 45%/55% mixtures of propylene glycol and glycerine inhibited mold growth in test solution concentrations of 22.5% and greater.

EXAMPLE 5

Tests were carried out to learn the effect of water content in casings for different amounts of propylene glycol.

A group of #8 size fibrous casings were used as in the Example 3. The casing samples were prepared by brushing solutions of water and propylene glycol over the surfaces of the casing samples in order to obtain the amounts of water and propylene glycol in the casing samples as set forth in Table 2.

TABLE 2

| Casing Sample | Casing Composition (parts by weight) | | | Propylene glycol | Water (% of total weight) | Propylene glycol (% of liquid components of casing) | Mold Growth |
|---|---|---|---|---|---|---|---|
| | Cellulose | Glycerol | Water | | | | |
| A | 72.5 | 22.0 | 15.3 | 0 | 13.9 | 0 | 0 |
| B | 72.5 | 22.0 | 17.9 | 0 | 15.9 | 0 | 0 |
| C | 72.5 | 22.0 | 25.1 | 0 | 21.0 | 0 | 0 |
| D | 72.5 | 22.0 | 30.8 | 0 | 24.6 | 0 | + |
| E | 72.5 | 22.0 | 33.5 | 0 | 26.2 | 0 | + |
| F | 72.5 | 22.0 | 38.4 | 0 | 28.9 | 0 | + |
| G | 72.5 | 22.0 | 41.1 | 0 | 30.3 | 0 | 0 |
| H | 72.5 | 22.0 | 56.0 | 0 | 37.2 | 0 | + |
| I | 72.5 | 22.0 | 137 | 0 | 59.2 | 0 | + |
| J | 72.5 | 22.0 | 12.8 | 1.8 | 11.7 | 5 | 0 |
| K | 72.5 | 22.0 | 14.0 | 1.9 | 12.7 | 5 | 0 |
| L | 72.5 | 22.0 | 24.4 | 2.4 | 20.1 | 5 | 0 |
| M | 72.5 | 22.0 | 28.2 | 2.6 | 22.5 | 5 | 0 |
| N | 72.5 | 22.0 | 36.4 | 3.1 | 27.2 | 5 | + |
| O | 72.5 | 22.0 | 9.7 | 3.5 | 9.0 | 10 | 0 |
| P | 72.5 | 22.0 | 15.9 | 4.2 | 13.9 | 10 | 0 |
| Q | 72.5 | 22.0 | 23.0 | 5.0 | 18.8 | 10 | 0 |
| R | 72.5 | 22.0 | 27.2 | 5.5 | 21.4 | 10 | 0 |
| S | 72.5 | 22.0 | 31.5 | 5.9 | 23.9 | 10 | 0 |
| T | 72.5 | 22.0 | 35.2 | 6.4 | 25.9 | 10 | 0 |
| U | 72.5 | 22.0 | 36.4 | 6.5 | 26.5 | 10 | 0 |
| V | 72.5 | 22.0 | 55.5 | 8.6 | 35.0 | 10 | + |
| W | 72.5 | 22.0 | 90.8 | 12.5 | 45.9 | 10 | + |

Visible mold growth after 12 months at room temperature where 0 = no growth; + = growth.

As described in the Examples 3, where possible, 50 foot lengths of the treated casing samples were shirred and compressed to about 1 foot in length, and retained in an elastic sheathing material. In those instances where large amounts of moisture and propylene glycol were present, flattened casing samples 5 feet in length were used.

A mixture containing thirty-one different mold spores as described in the Example 3 was used by brushing several milliliters of the mold spore solution onto a 3 inch by 6 inch area of exposed casing surface. The inoculated casing samples were thereafter packaged into polyethylene bags and stored at room temperature for one year.

A period of one year was selected because it represents a reasonable upper limit between the manufacturing of a food casing and the stuffing of the food casing. In current practice, the period of time between the manufacturing of a food casing and the stuffing of the food casing generally is a few months. It is anticipated that mold growth would occur earliest for a food casing having a relatively high moisture content, so that the absence of mold at the end of a one year period is an indication of mold growth being inhibited.

The casing samples A to I show the visible appearance of mold growth occurred at a moisture content of about 24.6% by weight and higher. The negative results for the casing sample G is not unusual for experiments of this type and should be regarded as typical mold growth anomaly lacking significance for the tests. The conclusion is supported by the other results for casing samples having no propylene glycol.

The casing samples J to N show that the presence of about 5% propylene glycol based on the liquid components of the casing improved the resistance of the food casings to mold growth.

The results best suited for commercialization of the invention were obtained for the casing samples O to W, each having about 10% propylene glycol based on the liquid components of the casing. It is surprising that this level of propylene glycol can be effective for inhibiting mold growth in a casing sample having a relatively high moisture content.

The results of this Example show that a propylene glycol content of about 10% by weight of the liquid components of the casing inhibits the growth of mold for moisture contents as high as about 26.5% by weight or higher. Thus, this propylene glycol content would provide protection for casings having a moisture content within the upper range of casings manufactured commercially.

We want it to be understood that we do not desire to be limited to the exact details described herein, for obvious modifications will occur to a person skilled in the art. Having thus described the invention, what we claim as new and desire to be secured by Letters Patents, is as follows:

What is claimed is:

1. A casing article useful for preparing an encased food product comprising in combination:
   (a) a length of a large size tubular cellulosic casing for stuffing with a food product to provide an encased food product and said casing having a fibrous web embedded in its wall;
   (b) moisture present in said casing in an amount of at least about 20% and up to about 35% by total weight of the casing, said moisture being present;
      (i) in an amount sufficient to impart to the casing the extensibility and flexibility needed to permit the stuffing of the casing with a food product without the addition of further moisture thereby rendering said casing a moisturized casing, and
      (ii) in excess of the moisture content capable of supporting the growth of mold and fungi on said moisturized casing;
   (c) packaging means which retains said moisturized casing therein, said casing being stuffable with a food product without the addition of further moisture after a storage period under ambient conditions of at least ten weeks; and (d) a water soluble antimycotic agent present within said moisturized casing in an amount sufficient to render said moisturized casing resistant to the growth of molds and fungi for at least the period of time said moisturized casing is retained in said packaging means.

2. The casing article of claim 1 wherein said cellulosic casing is shirred.

3. The casing article of claim 1 wherein said antimycotic agent comprises a polyhydric alcohol.

4. The casing article of claim 1 wherein said antimycotic agent is a member selected from the group consisting of propylene glycol, potassium propionate, sodium propionate, calcium propionate, potassium sorbate, sodium sorbate, calcium sorbate, sorbic acid, propionic acid and lower alkyl esters of parahydroxy-benzoic acid.

5. The casing article of claim 1 wherein said antimycotic agent comprises potassium sorbate.

6. The casing article of claim 1 wherein said antimycotic agent comprises propylene glycol in an amount of from about 5% to about 10% by weight of the liquid components in said casing.

7. A method of manufacturing a large size tubular cellulosic casing having a fibrous web embedded in its wall for use in stuffing with a food product comprising:

(a) incorporating into a length of said casing:
  (i) moisture to provide a moisture content of at least 20% and up to about 35% by weight of the casing, said moisture content being sufficient to impart to the casing the extensibility and flexibility needed to permit the stuffing of the casing with a food product without the addition of further moisture thereby rendering said casing a moisturized casing, said moisture content being in excess of the moisture content capable of supporting the growth of molds and fungi on the moisturized casing, and
  (ii) a water soluble antimycotic agent in an amount sufficient to render said moisturized casing resistant to the growth of molds and fungi for the period of time before said casing is stuffed with a food product, and thereafter (b) retaining said length of said casing in a packaging means, said casing being stuffable with a food product without the addition of further moisture after a storage period under ambient conditions of at least ten weeks.

8. The method as claimed in claim 7 including shirring said casing prior to said retaining step (b).

9. The method as claimed in claim 7 wherein said antimycotic agent comprises propylene glycol.

10. The method as claimed in claim 9 wherein said propylene glycol in said casing is present in an amount of at least about 5% up to about 10% by weight of the liquid components in said casing.

11. A casing article useful for preparing an encased food product comprising:

(a) a length of large size tubular cellulose casing containing a glycerine plasticizer and including a fibrous web embedded in its wall, and having a moisture content sufficient to impart to the casing the extensibility and flexibility needed to permit the stuffing of the casing with food product thereby rendering said casing a moisturized casing which is stuffable without the addition of further moisture;

(b) said moisture content being at least about 20% and up to about 35% by total weight of the glycerine plasticizer-containing casing and in excess of a moisture content capable of supporting the growth of mold and fungi thereon;

(c) packaging means which retains the moisturized glycerine plasticizer-containing casing therein, the casing being stuffable with a food product without the addition of further moisture after a storage period under ambient conditions of at least ten weeks; and (d) a water soluble antimycotic agent present within said moisturized glycerine plasticizer-containing casing in an amount sufficient to render the casing resistant to the growth of mold and fungi for at least the period of time it is retained in said packaging means.

12. A casing article as in claim 11 wherein said glycerine plasticizer is present in an amount not more than about 40% by weight of dry cellulose in said casing.

13. A casing article as in claim 12 wherein said antimycotic is selected from the group consisting of propylene glycol, potassium propionate, sodium propionate, calcium propionate, potassium sorbate, sodium sorbate, calcium sorbate sorbic acid, propionic acid and lower alkyl esters of parahydroxy-benzoic acid.

14. The casing article as in claim 12 wherein said antimycotic agent is a polyhydric alcohol.

15. A casing article as in claim 14 wherein said antimycotic agent is selected from the group consisting of propylene glycol, glycerine and mixtures thereof.

* * * * *

UNITED STATES PATENT AND TRADEMARK OFFICE
CERTIFICATE OF CORRECTION

PATENT NO. : 4,867,204

DATED : September 19, 1989

INVENTOR(S) : David E. Ellis; Herman S. Chiu

It is certified that error appears in the above-identified patent and that said Letters Patent is hereby corrected as shown below:

In col. 2, line 24, change "150" to --160--.

In col. 2, line 45, change "Marback" to --Marbach--.

In col. 2, line 50, change "Marback" to --Marbach--.

In col. 3, line 12, change "therefore" to --thereof--.

In col. 5, line 38, change "deactylation" to --deacetylation--.

In col. 5, line 43, change "application" to --applications--.

In. col. 5, line 46, change "2,015,273" to --2,105,273--.

In col. 7, line 4, change "casing" to --casings--.

In col. 8, line 8, change "Example" to --Sample--.

In col. 8, line 33, change "177" to --117--.

In col. 8, line 55, change "sample" to --samples--.

In col. 8, line 66, change "Regnerated" to --Regenerated--.

In col. 9, line 26, change "27.5%" to --37.5%--.

In col. 9, line 48 change "116021" to --16021--.

In col. 9, line 51, change "schlerotiorum" to --sclerotiorum--.

In col. 9, line 53, after the word "Culture" insert the words --Collection, Rockville, Maryland. Also included were mold--.

UNITED STATES PATENT AND TRADEMARK OFFICE
CERTIFICATE OF CORRECTION

PATENT NO. : 4,867,204

DATED : September 19, 1989

INVENTOR(S) : David E. Ellis/Herman S. Chiu

It is certified that error appears in the above-identified patent and that said Letters Patent is hereby corrected as shown below:

In col. 10, line 12, change "0.056%" to --0.05%--.

In col. 10, line 40, change "1.25%" to --12.5%--.

In col. 10, line 44, change "sever" to --seven--.

Signed and Sealed this

Twenty-fourth Day of September, 1991

Attest:

HARRY F. MANBECK, JR.

*Attesting Officer*    *Commissioner of Patents and Trademarks*

(12) EX PARTE REEXAMINATION CERTIFICATE (6728th)
United States Patent
Ellis et al.

(10) Number: US 4,867,204 C1
(45) Certificate Issued: Mar. 31, 2009

(54) MOISTURIZED TUBULAR CELLULOSIC FOOD CASING AND PROCESS FOR PREPARING

(75) Inventors: David E. Ellis, Frankfort, IL (US); Herman S. Chiu, Chicago, IL (US)

(73) Assignee: Viskase Corporation, Willowbrook, IL (US)

Reexamination Request:
No. 90/006,443, Nov. 5, 2002

Reexamination Certificate for:
Patent No.: 4,867,204
Issued: Sep. 19, 1989
Appl. No.: 07/298,277
Filed: Jan. 13, 1989

Certificate of Correction issued Sep. 24, 1991.

Related U.S. Application Data

(63) Continuation of application No. 07/143,306, filed on Jan. 11, 1988, now abandoned, which is a continuation of application No. 06/849,341, filed on Apr. 7, 1986, now abandoned, which is a continuation of application No. 06/498,709, filed on May 27, 1983, now abandoned, which is a continuation of application No. 06/157,008, filed on Jun. 6, 1980, now abandoned, which is a continuation of application No. 06/014,644, filed on Feb. 23, 1979, now abandoned, which is a continuation of application No. 05/874,293, filed on Feb. 1, 1978, now abandoned, which is a continuation-in-part of application No. 05/844,987, filed on Oct. 25, 1977, now abandoned, which is a continuation of application No. 05/686,248, filed on May 13, 1976, now abandoned.

(51) Int. Cl.
*A22C 13/00* (2006.01)
*C08K 5/053* (2006.01)
*C08K 5/00* (2006.01)

(52) U.S. Cl. .............. 138/118.1; 426/135; 428/34.8
(58) Field of Classification Search .............. 138/118.1, 138/177; 428/34.8; 206/802; 426/105, 133, 426/135, 140, 278, 282, 284, 310, 323, 326, 426/332, 335, 410, 413, 415, 420, 532, 506, 426/512, 513, 805
See application file for complete search history.

(56) References Cited

U.S. PATENT DOCUMENTS

| 2,796,362 A | 6/1957 | Wooding | 117/71 |
| 3,202,514 A | 8/1965 | Burgess | 99/2 |
| 3,222,192 A | 12/1965 | Arnold et al. | 99/176 |
| 3,250,629 A | 5/1966 | Turbak | 99/176 |
| 3,330,669 A | 7/1967 | Hollenbeck | 99/166 |
| 3,427,169 A | 2/1969 | Rose | 99/176 |
| 3,451,827 A | 6/1969 | Bridgeford | 99/176 |
| 3,523,850 A | 8/1970 | Uhline | 156/244 |
| 3,617,312 A | 11/1971 | Rose | 99/176 |
| 3,653,928 A | 4/1972 | Rose et al. | 99/176 |
| 3,664,844 A | 5/1972 | Miller | 99/18 |
| 3,818,947 A | 6/1974 | Rose | 138/118.1 |
| 3,852,483 A | 12/1974 | Oborsh et al. | 426/94 |
| 3,864,499 A | 2/1975 | Turbak | 426/138 |
| 3,922,356 A | 11/1975 | Cohly | 426/277 |
| 3,981,046 A | 9/1976 | Chiu | 17/49 |
| 4,377,187 A | 3/1983 | Chiu | 138/118.1 |
| 4,409,251 A | 10/1983 | Higgins | 426/413 |
| 4,664,861 A * | 5/1987 | Pritikin et al. | 264/171.12 |

FOREIGN PATENT DOCUMENTS

| AU | 151768 | 9/1950 |
| CA | 493644 | 6/1953 |
| CA | 902421 | 6/1972 |
| DE | 1099326 | 2/1961 |

* cited by examiner

*Primary Examiner*—James F Hook

(57) ABSTRACT

A method of manufacturing a large size tubular cellulosic food casing suitable for being stuffed with a foodstuff without requiring an additional moisturizing step prior to stuffing, comprising the steps of providing a large size tubular cellulosic food casing including a plasticizer substantially uniformly incorporated therein; adjusting the moisture content of the casing to impart to the casing sufficient extensibility and flexibility for the casing to be stuffed without the addition of further moisture prior to the stuffing of said casing, and treating the casing with an antimycotic agent to incorporate a sufficient amount of the antimycotic agent in the casing to render the casing resistant to growth of molds, fungi, and microorganisms prior to the stuffing of the casing with the foodstuff.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 12–15 is confirmed.

Claims 1–11 are cancelled.

* * * * *